Patented Apr. 25, 1950

2,505,735

UNITED STATES PATENT OFFICE 2,505,735

PURIFICATION OF CRUDE GLYCERINE

Harold S. Halbedel, Euclid, Ohio, assignor to The Harshaw Chemical Company, Cleveland, Ohio, a corporation of Ohio No Drawing. Application May 22, 1948, Serial No. 28,725

4 Claims. (Cl. 260—637)

This invention relates to purification of crude (soap lye and saponification) glycerine and has for its object to eliminate one distillation step from the usual double distillation at the same time obtaining a degree of purity sufficient to pass C. P. specifications and also obtaining freedom from objectionable odors.

The crude glycerine which is purified according to the invention is usually from 80% to 90% glycerol, the remainder being mostly water but including small amounts of aldehydes, ketones, free fatty acids and other impurities. It is common practice to adjust the pH of such crudes to about 5.5–6.0 and then perform the first distillation on the acid side. The distillate is then neutralized with caustic soda or soda ash to a pH of about 8.5–9.0 and again distilled, this time on the alkaline side so as to tie up the fatty acids as soaps to prevent their distilling over.

The present invention is concerned with the discovery that the distillation on the acid side as a pretreatment for the final distillation on the alkaline side can be replaced by a series of steps of a less expensive character. In accordance with the invention, the concentrated crude glycerine (75% to 90% or more glycerol) is agitated with zinc or iron metal or a mixture of the two in finely divided condition and sulfuric acid whereby to generate nascent hydrogen for reduction of aldehydes and ketones. As a result, there is also formed $ZnSO_4$, or $FeSO_4$, or both, if both iron and zinc are employed. Without having filtered the mixture, the pH is adjusted with an alkali, such as $NaOH$ or $Na_2CO_3$ or a mixture thereof, to a pH from 7.5 to 10.0 and filtration is then carried out. By thus filtering on the alkaline side adsorption of impurities by the carbon and the precipitated metal hydroxide, or basic salt is secured and all solids and materials adsorbed thereon are eliminated. The filtrate is then distilled once only on the alkaline side, which may be done without foaming, and the distillate is found to be free from objectionable odor and pure enough to meet C. P. specifications.

The quantity of metal used may be from $\frac{1}{10}$% to 10% of the weight of the glycerine. It should be finely divided, suitably 20 mesh or finer. The quantity of sulfuric acid present for reaction with the metal should be from 0.9 to 1.1 times the amount theoretically required to react with the metal to form $ZnSO_4$ or $FeSO_4$. Any mixture of Zn and iron aggregating quantities within the limits stated for each metal can be used.

The reaction should be carried out at an elevated temperature in order to complete it fairly quickly. The range from 80° C. to 120° C. is the most practical range and gives excellent results. The mixture may be agitated in this temperature range until the reaction is complete or at least until a major portion of the metal has reacted with the sulfuric acid, and it may be continued longer without objectionable results. A suitable time range for the agitation prior to neutralization is from 3 to 10 hours. A time of 4 to 6 hours may be considered optimum. A practical criterion for determining when the time for neutralization has arrived is the disappearance or substantial disappearance of odor. Usually the odor will have largely disappeared at the end of three hours but further time may be allowed if desired in order to insure best possible results.

Neutralization may be effected by use of a suitable alkali. $NaOH$ or $Na_2CO_3$ or any mixture thereof will be found very suitable and economical. The alkali may be added to a pH of from 7.5 to 10.0 and agitation may be continued for say an hour after addition of the alkali. While this is not essential, it does help to increase the particle size of the precipitate so that the filtration rate may be increased.

Filtration is effected after neutralization, since as above indicated this has been found to give a purer product and less foaming on subsequent distillation than if the mixture were filtered first and then neutralized. A suitable temperature for filtration is 80° C. although temperatures in the range 60° C. to 120° C. are satisfactory.

After filtration, the glycerine is distilled once only at a pH between 7.5 and 10.0 to remove a further quantity of impurities not removed by the above treatment. The product resulting is of high purity and free from objectionable odor even on acidification with $H_2SO_4$.

The following specific examples will serve to illustrate the invention:

Example I

To a body of 500 lbs. of saponification crude glycerine (9% water) was added 2.5 lbs. of Zn dust. There was added also 3.75 lbs. of 66° Bé. sulfuric acid (3.62 lbs. of $H_2SO_4$) and 2.5 lbs. of activated carbon. The temperature was held at 100° C. as nearly as possible, not varying therefrom more than plus or minus 5 degrees. The mixture was agitated in this temperature range for a period of 5 hours, it was then neutralized to a pH of 9.0 by adding 2 lbs. of caustic soda in 2 gallons of water. Agitation was continued for a period of one hour and the mixture then filtered. The filtrate was then distilled once only. No foaming difficulty was experienced during distillation. The once distilled product was free from unpleasant odor on acidification with $H_2SO_4$ and was pure enough to meet C. P. specifications.

*Example II*

Example I was repeated with soap lye crude glycerine (18% water), other conditions remaining the same and with practically the same results.

*Example III*

Example I was repeated except that 2.5 lbs. of iron were substituted for the Zn and 4.4 lbs. of 66° Bé. $H_2SO_4$ was used. The results were practically the same as in Example I.

Having thus described my invention, what I claim is:

1. Process for purification of glycerine comprising forming in a body of crude glycerine hydrogen and material of the class consisting of the sulfates of zinc and iron and mixtures thereof, the weight of the metal content of said material so formed being from $\frac{1}{10}$% to 1% of the weight of the glycerine, neutralizing the resulting mixture to a pH from 7.5 to 10.0 and then filtering off the solids and distilling the filtrate at pH values between 7.5 to 10.0 said crude glycerine initially containing at least 75% glycerol.

2. Process for purification of glycerine comprising contacting in a body of crude glycerine containing at least 75% glycerol from $\frac{1}{10}$% to 1% of the weight of said body of glycerine of a material of the class consisting of zinc and iron and mixtures thereof in finely divided, metallic condition, from 0.9 to 1.1 times the theoretical weight of sulfuric acid required to react with said material to form hydrogen and a metal sulfate material of the class consisting of $ZnSO_4$, $FeSO_4$ and mixtures thereof, and activated carbon in quantity from $\frac{1}{10}$% to 1% of the weight of the glycerine, neutralizing the resulting mixture to a pH from 7.5 to 10.0, filtering off the solids and distilling the filtrate at pH values from 7.5 to 10.0, the neutralization step being carried out before the filtration step.

3. Process for purification of glycerine comprising agitating crude glycerine containing at least 75% glycerol at from 80° C. to 120° C. for from 3 to 10 hours with from $\frac{1}{10}$% to 1% of its weight of a material of the class consisting of zinc and iron and mixtures thereof in finely divided condition, from 0.9 to 1.1 times the theoretical weight of sulfuric acid required to react with said metal to form a metal sulfate material of the class consisting of $ZnSO_4$, $FeSO_4$ and mixtures thereof, and activated carbon from $\frac{1}{10}$% to 1% of the weight of the glycerine, neutralizing the resulting mixture to a pH from 7.5 to 10.0, filtering off the solids and distilling the filtrate at pH values from 7.5 to 10.0, the neutralization step being carried out before the filtration step.

4. Process for purification of glycerine comprising agitating crude glycerine containing at least 75% glycerol at from 80° C. to 120° C. for from 3 to 10 hours with from $\frac{1}{10}$% to 1% of its weight of zinc in finely divided condition, from 0.9 to 1.1 times the theoretical weight of sulfuric acid required to react with the zinc metal to form hydrogen and $ZnSO_4$, and activated carbon from $\frac{1}{10}$% to 1% of the weight of the glycerine, neutralizing the resulting mixture to a pH from 7.5 to 10.00 with an alkali of the class consisting of NaOH and $Na_2CO_3$ and mixtures thereof, filtering off the solids and distilling the filtrate at pH values from 7.5 to 10.0, the neutralization step being carried out before the filtration step.

HAROLD S. HALBEDEL.

REFERENCES CITED

The following references are of record in the file of this patent:

UNITED STATES PATENTS

| Number | Name | Date |
|---|---|---|
| 280,893 | Baujard | July 10, 1883 |
| 1,344,850 | Bassett | June 29, 1920 |
| 2,276,142 | Atwood | Mar. 10, 1942 |
| 2,366,990 | Wallerstein et al. | Jan. 9, 1945 |